United States Patent
Suino

(10) Patent No.: US 7,167,236 B2
(45) Date of Patent: Jan. 23, 2007

(54) METHOD FOR AUTOMATIC TESTING OF OPTICAL FIBRES IN MULTIBRANCH NETWORKS

(75) Inventor: Diego Suino, Turin (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 10/504,040

(22) PCT Filed: Feb. 12, 2003

(86) PCT No.: PCT/EP03/01360

§ 371 (c)(1),
(2), (4) Date: Aug. 5, 2004

(87) PCT Pub. No.: WO03/073654

PCT Pub. Date: Sep. 4, 2003

(65) Prior Publication Data

US 2005/0146711 A1    Jul. 7, 2005

(30) Foreign Application Priority Data

Feb. 28, 2002 (IT) ............................. TO2002A0168

(51) Int. Cl.
G01N 21/00 (2006.01)

(52) U.S. Cl. ................................... 356/73.1
(58) Field of Classification Search .................. None
See application file for complete search history.

(56) References Cited

U.S. PATENT DOCUMENTS

| | | | |
|---|---|---|---|
| 6,028,661 A | 2/2000 | Minami et al. | |
| 6,310,702 B1 | 10/2001 | Minami et al. | |
| 6,512,610 B1 * | 1/2003 | Minami et al. | 398/21 |
| 6,519,026 B1 * | 2/2003 | Holland | 356/73.1 |

FOREIGN PATENT DOCUMENTS

DE    199 10 867    9/1999

* cited by examiner

Primary Examiner—Tu T. Nguyen
(74) Attorney, Agent, or Firm—Andrew Wilford

(57) ABSTRACT

A method of testing optical fibers in which a reference trace is generated and the power levels of backscattered optical signals are measured are stored according to distance, thereby identifying fiber section ends according to the attenuation in power levels. If a power level attenuation exceeds a predetermined threshold near the end of a section is detected a series of detailed checks is run comparing the trace tested with the reference trace starting with the furthest distance and identifying the first end where there is an increase in attenuation.

6 Claims, 2 Drawing Sheets

METHOD FOR AUTOMATIC TESTING OF OPTICAL FIBRES IN MULTIBRANCH NETWORKS

CROSS REFERENCE TO RELATED APPLICATIONS

This application is a national stage of PCT/EP 03/01360 filed 12 Feb. 2003 and based upon the Italian application TO 2002 A 000168 filed 28 Feb. 2002.

FIELD OF THE INVENTION

The invention relates to optical telecommunications system testing tools and specifically relates to a method for automatically testing optical fibers in multi-branch networks.

BACKGROUND OF THE INVENTION optical fiber transmission systems are very widespread today and support very high speed audio and video transmissions. The need for reliable tools that are capable of detecting faults and deterioration of the physical carrier, i.e. of the fiber, is increasingly felt.

Testing apparatuses normally test transmitted data to identify data transmission degradation. Unfortunately, considering that the systems are highly dynamic thus allowing error-free operation even in the presence of considerable line attenuation, damage beyond repair is already in progress when degradation is identified. The importance of testing systems, which are independent from the transmission apparatuses and capable of indicating not only extreme events (such as loss of optical fiber continuity due to breakage or opening of a connector), but also gradual deterioration in fiber efficiency, is evident.

Systems with such characteristics implementing different technical solutions are currently marketed. The most common employ an optical reflectometer implementing OTDR (Optical Time Domain Reflectometry) technology. The system pumps a light signal pulse at a different wavelength from that used for signal transmission so that it can be easily filtered out ahead of the reception apparatuses without interfering with transmission. The light pulse pumped by the reflectometer laser is backscattered on the fiber and returns to the instrument which uses it to trace the optical power of the line according to distance. The smallest line attenuation can be detected by periodically repeating the test on the fiber and comparing the current and the previously recorded or reference traces.

Off-the-shelf systems of this kind are typically designed to work in long-haul networks and are used to test one optical fiber line at a time by means of one or more optical switching devices.

The matter is more complicated when a multi-branch optical network (i.e. a network with several fibers formed through passive optical branch points from a primary line consisting of a single fiber) is to be tested. Analyzing the optical reflectometer trace is more complex because the backscattered light from the various fibers is summed in the branch point before returning to the reflectometer. It is consequently difficult to identify the fiber in the network where the variation may have occurred.

Testing each fiber would obviously increase costs both in terms of passive elements needed to pump optical signals at testing length into each optical fiber (WDM, optical filters, switch ports, etc.) and decreased analysis speed of the entire network.

An OTDR trace analysis method is described in U.S. Pat. No. 6,028,661 dated 22 Feb. 2000. According to the described method, the trace acquired by the reflectometer is analyzed by studying the correlation between adjacent points in the trace employing the solution of a system of equations based on the minimum square method. The solution of this system of equations (the number of which is equal to the number of branches forming the network), is used to estimate an attenuation coefficient for each branch. The variation of one of the coefficients indicates the presence of a variation in the corresponding fiber. This method is rather complicated and consequently slow to run and difficult to implement.

SUMMARY OF THE INVENTION

The method for automatically testing optical fibers in multi-branch networks described in this invention, based on regular acquisition of OTDR traces of the concerned network, overcomes these shortcomings and solves the aforesaid technical problems. The method is particularly suitable for automatically testing branched networks, specifically several multi-branch networks and works upstream of the branch point in each network. The number of passive optical components needed to pump the test signal into the fibers and identify it at the end of the lines is decreased and the scanning frequency, i.e. the number of times a certain line is tested per unit of time, is increased.

The method is capable of identifying the fiber and the section where the backscattered signal attenuation ratio is increased by very simply analyzing the OTDR trace (consisting of the light backscattered by the various fibers of the multi-branch network); the analysis is consequently fast and easily implemented.

BRIEF DESCRIPTION OF DRAWINGS

These and other characteristics of the invention will now be described with reference to a preferred embodiment in the annexed drawing by way of example only, wherein.

DETAILED DESCRIPTION

Figure 1:
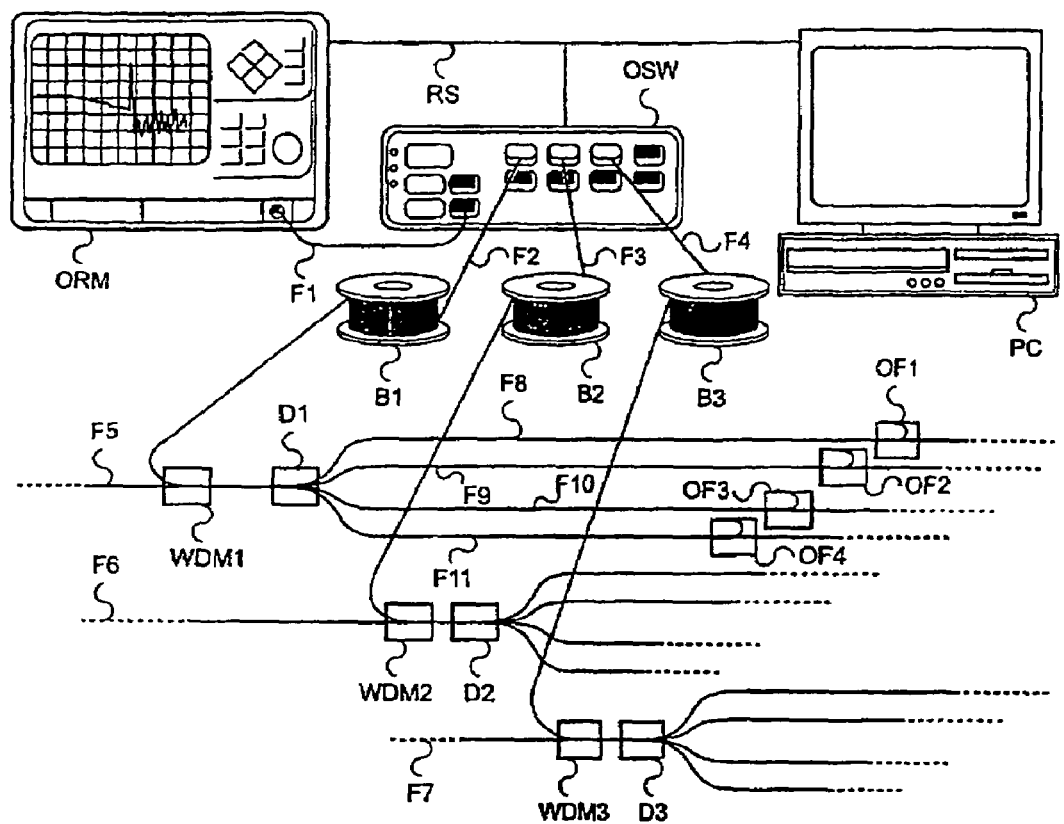
FIG. 1 is a sketch of the test bench and the network.

As mentioned above, the method implements OTDR technology according to which the traces referring to optical signals pumped on the network and backscattered are periodically analyzed. FIG. 1 shows a test bench consisting of an off-the shelf optical reflectometer ORM capable of working at a different wavelength from that normally used for telecommunications, e.g. 1625 nm. This wavelength is chosen so that the test can be conducted also on lines which are already engaged by normal traffic, providing that suitable branching devices, which are sensitive to the wavelength, and filters are installed.

The bench also comprises an off-the-shelf optical switch module OSW which receives the pulse signal on fiber F1 from the optical reflectometer ORM and sends it on three fibers F2, F3 and F4 in later instances to test several networks at the same time.

The fibers are connected to the networks through shunt trips B1, B2 and B3, needed to create a sufficient delay to make the signals backscattered by the optical fibers visible upstream of branch points D1, D2 and D3, whose task is to suitably split the input electrical power and send the individual fractions into the various fibers, e.g. fibers F8, F9, F10 and F11 connected to branch point D1.

The optical test signals are pumped into the main fibers F5, F6 and F7 of the three networks through wave division multiplexers WDM1, WDM2 and WDM3. Optical filters OF1, OF2, OF3 and OF4, whose task is to permit the transit of optical signals used for transmitting data, and block those used for the test, are located on the ends of the fibers.

Obviously, the backscattered optical signals from the various fibers return to the reflectometer ORM to be analyzed by crossing devices D1, WDM1, B1, B2 . . . , and switching module OSW. Both the reflectometer ORM and the switching module OSW are controlled by a personal computer PC via an electrical connection RS. The personal computer can run the various steps of the method when equipped with suitable software.

Figure 2:
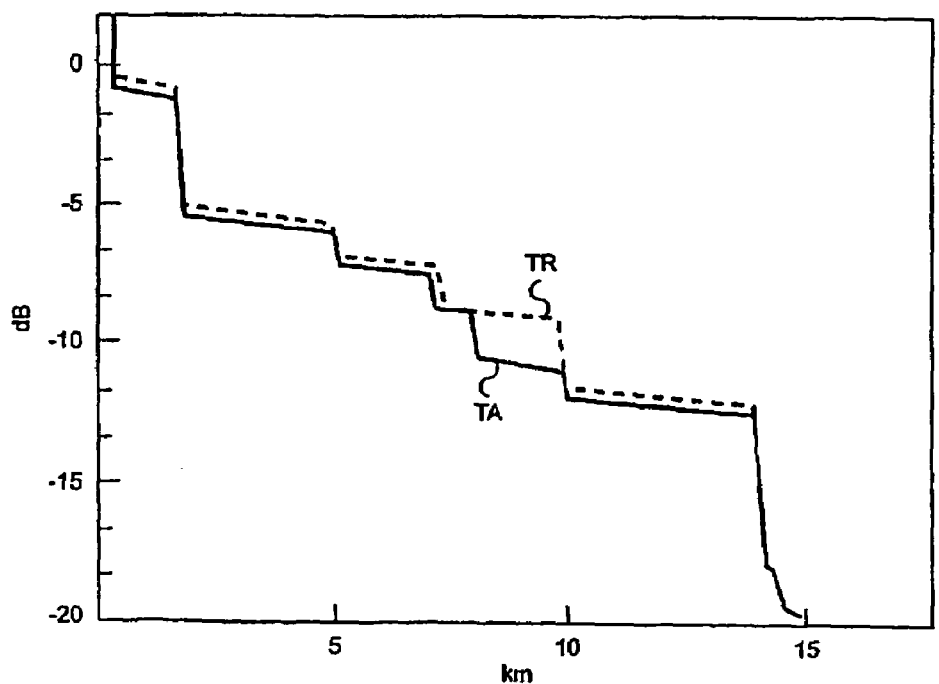
FIG. 2 is an image on an optical reflectometer monitor in the event of a fault.

A typical image that may appear on the monitor of the optical reflectometer ORM is shown in FIG. 2. In this example, a reference trace TR (shown by the broken line) is shown along an alarm trace TA (shown by the solid line). In both cases, the ordinate shows the relative power of the backscattered signal and the abscissa shows the distance in kilometers from the reflectometer. The network under test consists of a main fiber which branches into four lower level fibers whose ends are approximately 5 kilometers, 7 kilometers, 10 kilometers and 14 kilometers away from the test bench. For the sake of simplicity, the network is considered to consist of the following five sections:

the first section consists of the single fiber which reaches the branch point from the reflectometer and is approximately 1.5 kilometers long;

the second section consists of the four fibers output from the branch point and goes from 1.5 kilometers to 5 kilometers;

the third section is reduced to three fibers and goes from 5 kilometers to 7 kilometers;

the fourth section is reduced to two fibers and goes from 7 kilometers to 10 kilometers; the fifth section is reduced to one fiber only and goes from 10 kilometers to 14 kilometers.

It is evident that each section starts and ends in correspondence with the end of a fiber and comprises all the fibers whose length are comprised within the boundaries of the section. The first segment of the traces visible on the monitor, referred to the first network section, is the sum of the backscattered powers of all fibers. As shown by the reference trace, the level decreases in correspondence with the end of each section—and consequently of each fiber— because the power contribution backscattered by the fiber ends at that point.

To ensure easy application of the method, it is important to note that the lengths of the optical fibers in the network are all respectively different so that the end-of-fiber points of the various sections are different. This condition is easily obtained by including additional fiber sections along fibers with the same length.

Attention must be given to attenuation points which may be present, such as couplings or connectors along the fibers, which may generate confusion. In this case, the approximate length of the fibers must be known.

The trace analysis method, as mentioned, consists in comparing the periodically tested levels and the trace stored as a reference. Specifically, normalized power levels are considered with respect to the power level at network input so to free the test from inevitable variations in the output level of the reflectometer laser, which would change the vertical position of the traces.

The alarm trace TA in FIG. 2 shows that the backscattered signal level is lower in the forth section at a distance of approximately 8 kilometers from the reflectometer. The lowering is maintained until the end of the section, at a distance of 10 kilometers, after which the alarm trace and the reference trace overlap again.

Having identified an alarm by detecting variations exceeding a predetermined threshold, the fiber in the section where the attenuation ratio has increased and the one involved in the fault must be univocally identified.

Figure 3:
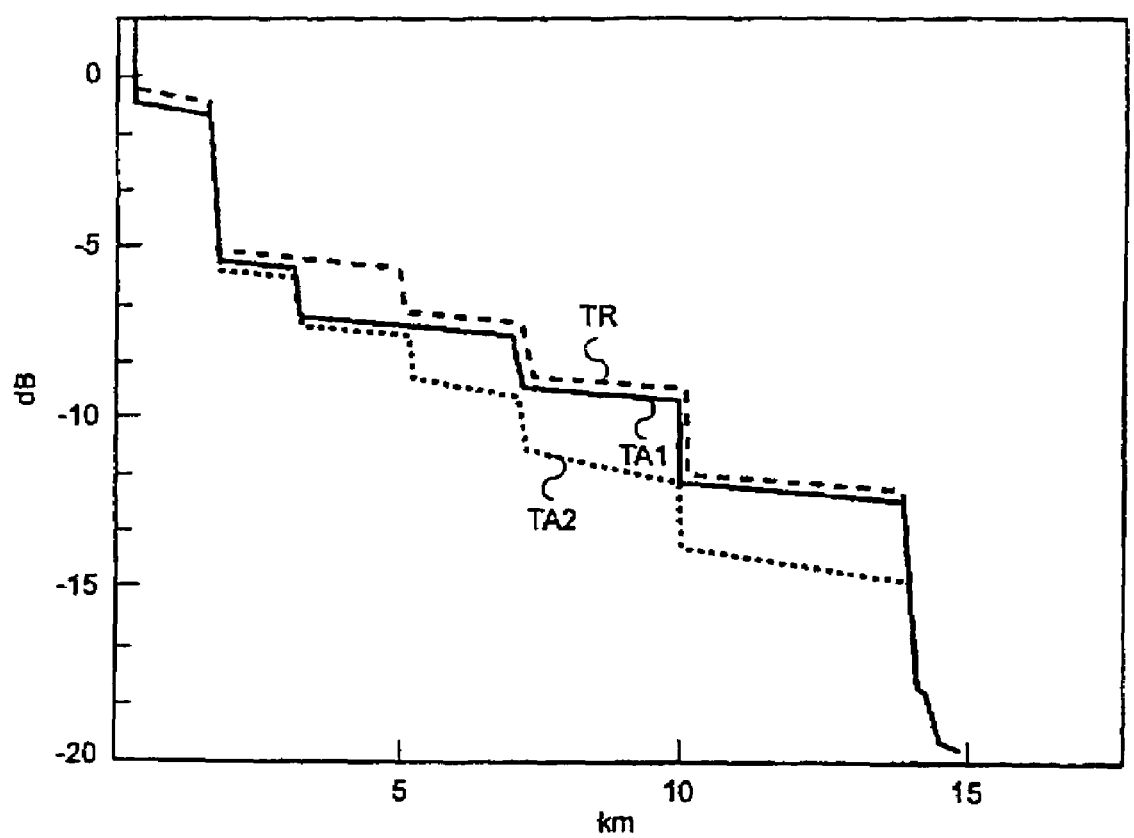
FIG. 3 shows the possible images which may appear on the monitor of an optical reflectometer in the event of two different types of network faults.

This is because the fiber where the increase occurred is not immediately apparent because the fault may be located in any of the fibers forming that particular part of the trace. FIG. 3, for example, shows two traces TA1 (solid line) and TA2 (dotted line) which both present level decrease at 3 kilometers from the reflectometer, i.e. on the second section; in TA1 the cause of attenuation is located on the 5 kilometer long fiber (i.e. the one that ends at the end of the second section) while in TA2 the attenuation is located on the 14 kilometer long fiber (i.e. the one that ends at the end of the fifth section). The reference trace TR (dotted line) is the condition without increases in attenuation.

The patterns of the two traces TA1 and TA2 near the attenuation increase point is identical. The difference appears at the end of each section: in the case of trace TA1, the increase in attenuation with respect to the reference trace TR remains only at the end of the second section, while in the case of trace TA2, the variation with respect to the reference trace affects the entire trace to the end of the fifth section.

In general, the fiber on which the fault occurred is the one which ends in correspondence with the point which:

presents a reduced level of power with respect to that shown by the reference trace;

is the most distant from the test bench.

The personal computer PC sets the tests and detects the results indicating alarms employing an application which implements the following method:

initializes test and analysis parameters according to the test bench operator;

generates a reference trace when it is sure the network is operating properly, measuring and storing the power levels of the backscattered optical signal according to distance, and identifying the ends of sections corresponding to ends of fibers according to power level attenuation;

periodically compares the levels at the end of section with the levels plotted when making the reference trace;

if a level attenuation exceeding a predetermined threshold is detected near the end of a section, passes into an alarm state and starts a detailed test cycle, by performing:

comparing the trace under test with the reference trace starting from the furthermost distance to identify both the first section where the attenuation increase is identified and the distance where the attenuation increase started.

At this point, the fiber where the attenuation occurred is univocally identified being the one, as mentioned above, which ends in correspondence with the end of the identified section and the distance from the test bench where the fault occurred.

The initialization step of the method consists in defining the various, test parameters for each of the networks under test, specifically:

number of networks to be tested;
number of fibers in each network;
alarm thresholds;
optical reflectometer test parameters, specifically:
wavelength;
pulse width;
maximum fiber length;
average result average time.

It is noted that the description herein is provided by the way of an example only. Variants and changes are possible without departing from the scope of the present invention.

The invention claimed is:

1. A method for the automatic testing of optical fibers in multi-branch networks, in which an optical pulse test signal is pumped into a main fiber upstream of each branch point from which individual fibers to be tested depart, and the corresponding backscattered signal is periodically analyzed to obtain optical power levels corresponding to a distance from an optical reflectometer, said optical power levels being suitable for use to automatically test operating conditions of the multi-branch network that is divided into sections that each start at an end of a fiber and that each end at an end of the next fiber, the method comprising the steps of:

generating a reference trace when it is sure the network is operating properly, measuring and storing the power levels of the backscattered optical signals according to distance from the reflectometer, and identifying the section ends according to the attenuation in power levels;

periodically measuring power levels of the backscattered optical signals at the ends of sections and comparing the measured power levels with the levels stored when making the reference trace; and if a power level attenuation of the backscattered optical signal exceeding a predetermined threshold is detected near the end of a section, running a series of detailed checks comprising:

comparison between the trace of the backscattered optical signal and the reference trace starting with the farthest distance;

identification of the first end of section where there is an increase in attenuation, the fiber in which the increase occurred being the fiber that ends in the end of the section that was identified; and identification of distance from the optical reflectometer within which the increase in attenuation started.

2. The method according to claim 1 further comprising an initialization step during which two or more of the following parameters are defined:
number of networks to be tested;
number of fibers in each network;
alarm thresholds setting;
pulse signal wavelength;
pulse width;
maximum fiber length; and
average result execution time.

3. The method according to claim 1, wherein all the optical fibers of the network are made to have different lengths by adding fiber sections to the fibers that have the same length.

4. The method according to claim 1, wherein the test is run on several networks at the same time by temporally switching the optical reflectometer on the main fibers of each network.

5. A system for performing automatic testing of optical fibers in multi-branch networks divided into sections that each start at the end of a fiber and that each end at the end of the next fiber, the system comprising a test bench including:

an optical reflectometer capable of sending an optical pulse signal into an optical fiber of said multi-branch network and periodically analyzing a corresponding backscattered signal to obtain optical power levels corresponding to distance from the reflectometer;

an optical switch capable of transferring the optical signal coming from said optical reflectometer to one or more outputs connected to respective fibers and vice versa;

shunt trips capable of delaying said optical signal sent to the multi-branch network; and a computer capable of controlling said optical reflectometer and said optical switch through a data line and capable of performing the steps of:

generating a reference trace when it is sure the network is operating properly, measuring and storing the power levels of the backscattered optical signal according to distance from the reflectometer, and identifying the section ends according to the attenuation in power levels;

periodically measuring power levels of the backscattered optical signals at the ends of sections and comparing the measured Dower levels with the levels stored when making the reference trace; and if a power level attenuation exceeding a predetermined threshold is detected near the end of a section, running a series of detailed checks comprising:

comparison between the backscattered optical signal being tested and the reference trace starting with the farthest distance;

identification of the first end of section where there is an increase in attenuation, the fiber in which the increase occurred being the fiber that ends in the end of section that was identified; and identification of distance from the reflectometer within which the increase in attenuation started.

6. A computer program that can be directly loaded in the internal memory of a computer and comprising software code for running a method for the automatic testing of optical fibers in multi-branch networks, in which an optical pulse test signal is pumped into main fiber upstream of each branch point from which individual fibers to be tested depart, and the corresponding backscattered signal is periodically analyzed to obtain optical power levels corresponding to a distance from an optical reflectometer, said optical power levels being suitable for use to automatically test operating conditions of the multi-branch network that is divided into sections that each start at the end of a fiber and that each end at the end of the next fiber, the method comprising the steps of:

generating a reference trace when it is sure the network is operating properly, measuring and storing the power levels of the backscattered optical signals according to distance from the reflectometer, and identifying the section ends according to the attenuation in power levels;

periodically measuring power levels of the backscattered optical signals at the ends of the sections and comparing the measured power levels with the levels stored when making the reference trace; and if a power level attenuation of the backscattered optical signal exceeding a predetermined threshold is detected near the end of a section, running a series of detailed checks comprising:

comparison between the trace of the backscattered optical signal and the reference trace starting with the farthest distance;

identification of the first end of section where there is an increase in attenuation, the fiber in which the increase occurred being the fiber that ends in the end of section that was identified; and identification of distance from the reflectometer within which the increase in attenuation started.

* * * * *